US008499332B2

(12) United States Patent
Guillot et al.

(10) Patent No.: US 8,499,332 B2
(45) Date of Patent: Jul. 30, 2013

(54) ELECTRONIC BOARD PROVIDED WITH SECURITY FUNCTIONS AND METHOD FOR ENSURING ELECTRONIC BOARD SECURITY

(75) Inventors: Philippe Guillot, Bruz (FR); Patrick Vigneron, Rennes (FR); Philippe Launay, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 812 days.

(21) Appl. No.: 12/308,022

(22) PCT Filed: Jun. 4, 2007

(86) PCT No.: PCT/EP2007/055458
§ 371 (c)(1),
(2), (4) Date: Jul. 1, 2009

(87) PCT Pub. No.: WO2007/141233
PCT Pub. Date: Dec. 13, 2007

(65) Prior Publication Data
US 2010/0017852 A1    Jan. 21, 2010

(30) Foreign Application Priority Data

Jun. 8, 2006 (FR) .................................. 06 52064

(51) Int. Cl.
*G06F 21/00* (2006.01)
(52) U.S. Cl.
USPC ................. 726/2; 726/34; 713/168; 713/170; 713/176; 380/51; 380/255; 705/75; 455/558
(58) Field of Classification Search
USPC ........................................ 726/34, 2; 713/192
See application file for complete search history.

(56) References Cited

U.S. PATENT DOCUMENTS

| | | | | |
|---|---|---|---|---|
| 5,606,468 A | * | 2/1997 | Kodama | ........................... 360/75 |
| 6,126,070 A | * | 10/2000 | Fukuzumi | ..................... 235/380 |
| 6,418,552 B1 | | 7/2002 | Osborn | |

(Continued)

FOREIGN PATENT DOCUMENTS

| | | |
|---|---|---|
| EP | 1387238 | 2/2004 |
| EP | 1580922 | 9/2005 |
| FR | 2857534 | 1/2005 |

OTHER PUBLICATIONS

Zhizhe et al., "An Adaptive Approach in Digital Distance Protection", Power Delivery, IEEE Transactions on Date of Publication: Jan. 1991, vol. 6 , Issue: 1, pp. 135-142.*

(Continued)

*Primary Examiner* — Morshed Mehedi
(74) *Attorney, Agent, or Firm* — Myers Wolin, LLC (57) ABSTRACT

An electronic card is disclosed including circuits of the protected zone include at least one control circuit. The electronic card further includes another zone defining a non-protected environment; the circuits of this zone do not need to comply with the distance constraint. The communication between the circuits of the protected zone and the non-protected environment is carried out by a communication circuit allowing or not allowing the electrical signals to pass. The passage of the electrical signals in the communication circuit is conditioned by an electrical control signal sent by the control circuit. Also disclosed is a method allowing the control circuit to be blocked if the electrical status of the signal controlling the passage of the signals does not correspond to the status imposed by the control circuit.

9 Claims, 5 Drawing Sheets

U.S. PATENT DOCUMENTS

| | | | |
|---|---|---|---|
| 6,704,871 B1* | 3/2004 | Kaplan et al. | 713/192 |
| 6,708,273 B1* | 3/2004 | Ober et al. | 713/189 |
| 7,549,064 B2* | 6/2009 | Elbert et al. | 713/194 |
| 7,707,621 B2* | 4/2010 | Walmsley | 726/2 |
| 2003/0200406 A1* | 10/2003 | Kouno | 711/164 |
| 2003/0209793 A1* | 11/2003 | Nishizawa et al. | 257/679 |
| 2003/0212897 A1* | 11/2003 | Dickerson et al. | 713/200 |
| 2005/0257182 A1 | 11/2005 | Dong | |
| 2006/0053246 A1* | 3/2006 | Lee | 711/100 |
| 2006/0092803 A1* | 5/2006 | Tatsuzawa et al. | 369/59.22 |
| 2007/0026892 A1* | 2/2007 | Neuhaus et al. | 455/558 |

OTHER PUBLICATIONS

Search Report Dated Aug. 30, 2007.

* cited by examiner

ELECTRONIC BOARD PROVIDED WITH SECURITY FUNCTIONS AND METHOD FOR ENSURING ELECTRONIC BOARD SECURITY

This application claims the benefit, under 35 U.S.C. §365 of International Application PCT/EP2007/055458, filed Jun. 4, 2007, which was published in accordance with PCT Article 21(2) on Dec. 13, 2007 in French and which claims the benefit of French patent application No. 06 52064, filed Jun. 8, 2006.

The present invention relates to an electronic card featuring protective functions and a method for protecting the electronic card.

The electrical devices contain one or more printed circuits on which electronic components are fitted. In such a manner as to increase the density of the circuits and to enable the use of circuits having many pins, the printed circuits are equipped with several layers of copper strips thus providing the electrical connections, the width of the copper strips typically being 0.3 millimeters. To realise the electrical connection between several levels, the most common technique is that of through holes. The printed circuit is drilled with holes and a metallization is carried out in the hole to electrically connect all the copper strips crossed by the hole.

Some devices have security functions. Among these, the following are found: bank devices, access control units to premises or computers, control units of dangerous equipment (radiological machines, weapons checks, locking of military craft, etc.), devices comprising security modules enabling keys or signatures to be generated by means of cryptographic calculation, television decoders, etc. These devices generally enable access to data when the security codes are correctly presented. The verification of these security codes is carried out using keys recorded in a memory of a component. A large part of the security of the system comes from the fact that these keys cannot be read outside of a protected area. To protect the access to the memory containing sensitive data, a first method consists in embedding all of the components and the printed circuit in a resin or polymerised glue. Connectors attached to the resin block enable the communication, notably the introduction of access codes. If a malintentioned person wishes to access the memory component, they must dissolve the resin without deteriorating the printed circuit and electronic components. Although difficult, this work is feasible by using significant means. Next, the malintentioned person switches on the circuit and can spy on the signals exchanged between the different components using metal styluses with a very thin extremity. The resin or the polymerised glue complicates the manufacturing process and increases the price of the printed circuit. Another means to prevent the insertion of styluses, consists in bringing the components to protect closer together in such a manner that they are not distant by more than 3 millimeters. It is considered that, below this distance, it is not possible to slide in a stylus.

Generally, only some of the components are directly concerned by the security; the central processing unit, the read-only memory, the cryptoprocessor are typically found among these components. The data to protect is generally exchanged by a communication bus. A large number of circuits receive and/or transmit data on this bus and do not necessarily have protective functions. However, these circuits receive by the bus the same data to protect; they must therefore be distant from each other by at the most 3 millimeters. Experience proves that above five components, it is almost impossible to position them while complying with this rule of 3 millimeters.

The document FR 2 857 534 submitted by INNOVA CARD describes in integrated circuit comprising an ordinary module and a protected module connected to each other by a protected link. The requests transmitted to the protected module circulate uncoded on the ordinary bus and are encrypted on the protected bus. The modules comprise master and slave elements. The request coming from a master element is encrypted by its scrambling module before being transmitted to a slave element. It is then decrypted by a protection module that routes it to the slave element. This document does not describe solutions enabling the probing of the signals to be limited by electrical conductors applied to the printed circuit.

The present invention enables among other things the constraints of implementing integrated circuits to be limited while ensuring a high level of security in certain zones of the printed circuit.

The invention relates to an electronic card comprising a protected zone comprising a plurality of first electronic circuits including a control circuit, said first circuits being distant from each other by at the most a determined distance, the electrical links connected to the first circuits and transmitting protected signals not being distant from said first circuits by at the most said determined distance, and a non-protected zone comprising second electronic circuits that are distant from the first circuits by more than the determined distance of which the electrical links transmitting protected signals are distant by more than said determined distance, characterized in that the protected zone comprises a communication circuit enabling the passage of signals between the first and second circuits, the passage of the electrical signals in the communication circuit being conditioned by an electrical control signal sent by the control circuit.

In this manner, the signals subjected to security constraints only leave the protected zone if the control circuit authorises it.

According to an improvement, several communication circuits receive the same electrical control signal sent by the control circuit. In this manner, relatively common circuits can be used and arranged on the electronic card to obtain the number necessary for the protection of all the signals. According to an improvement, a part of the signals exchanged between the first and second circuits cross the communication circuit, the signals not crossing the circuit being considered not to be protected. In this manner, the number and size of the communication circuit are optimised.

According to an improvement, the electrical control signal conditioning the passage of the electrical signals in the communication circuit depends on the operating code of the instruction being executed in the control circuit. In this manner, the protection of the data is provided instruction by instruction. According to a variant, the electrical control signal depends on the address of the operating code of the instruction being executed in the control circuit. In this manner, program code banks can be compartmentalised and assigned and security criterion. According to a variant, the electrical control signal is sent by an output port of the control circuit. It is thus possible to use a very common circuit and use a port to set, by an electrical level, the protected or non-protected status of the instructions that will then be executed.

According to an improvement, the electrical control signal is connected to an input port of the control circuit in such a manner as to be able to read its electrical status present on the electronic card. The control circuit blocks if the status detected physically at the level of the input port does not correspond to the logical status imposed by the control circuit. In this manner, if an attempt is made to force the electrical control signal to an inactive status, it can be detected and if necessary block the operation of the control circuit. According to an improvement, the communication circuit contains a memory enabling the control circuit to backup data. In this manner, the communication circuit and the memory only constitute a single circuit; there is therefore one less circuit to be integrated into the protected zone.

The present invention also relates to an access control method to data within an electronic card comprising a protected zone comprising a plurality of first electronic circuits including a control circuit, said first circuits being distant from each other by at the least a determined distance, the electrical links connected to the first circuits and transmitting protected signals not becoming distant from said first circuits by at the least said determined distance, and a non-protected zone comprising second electronic circuits that are distant from the first circuits by more than the determined distance or whose electrical links transmitting the protected signals are distant by more than said determined distance, characterized in that the protected zone comprises a communication circuit enabling the passage of signals between the first and second circuits, the passage of the electrical signals in the communication circuit being conditioned by an electrical control signal sent by the control circuit, the method comprising a reading step of the electrical control signal by the control circuit in such a manner as to be able to read its electrical status, and a blocking step of said control circuit if the detected electrical status does not correspond to the status imposed by the control circuit.

Other characteristics and advantages of the invention will emerge with the description of a non-restrictive embodiment of the invention, explained using the figures herein, among which.

Figure 1:
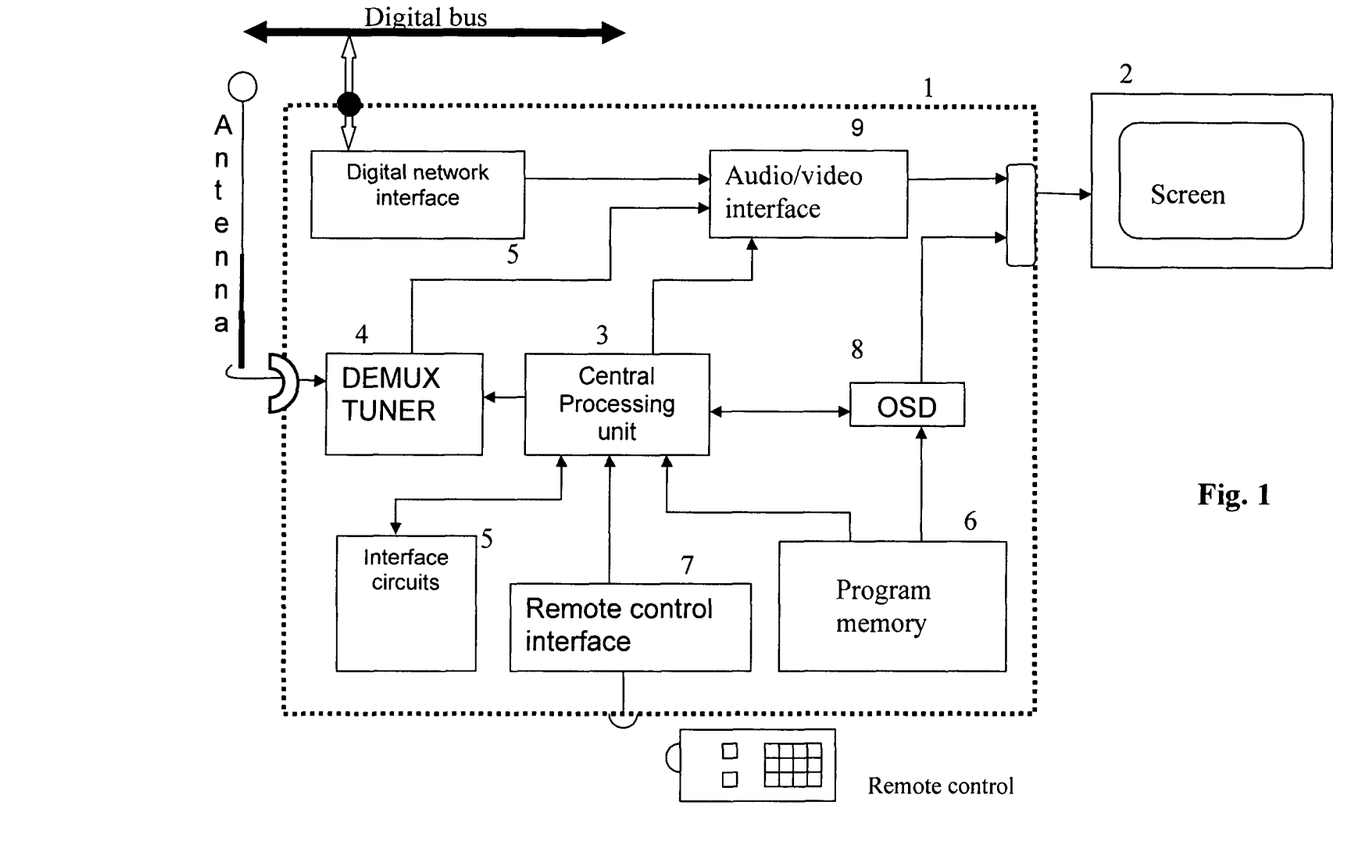
FIG. 1 is a block diagram of a television programme receiver containing an electronic card embodiment.

According to a preferred embodiment, the electronic card is implemented in a receiver as shown in FIG. 1, typically a decoder associated with a display device 2. The receiver comprises a central processing unit 3 connected to a programme memory 6, an infrared signal receiver 7 to receive the signals of a remote control, interface circuits 5 to for example display data on the front panel and an audio/video decoding logic 9 to generate the audiovisual signals sent to the television screen 2. The receiver 1 also comprises a circuit 8 for displaying data on the screen, often referred to as OSD circuit, from "On Screen Display". The OSD circuit 8 is a text and graphics generator that enables on-screen display of menus, pictograms or other graphics. The receiver has a connector notably enabling audio and/or video data of a broadcast network to be received by means of a reception antenna associated with a demodulator 4, this network can be of the radio, cable or satellite type. The connectors also provide the communication with a local high bitrate digital bus enabling information to be received on the audio content broadcast. The interface 5 can also connect other devices, for example devices equipped with connections of the type USB, CVBS (composite video input) or 4:2:2 (CCIR 656—digital video), by means of other connectors.

It is goes without saying that any device equipped with an electronic card and having protective functions falls within the scope of the present invention. The electronic card can for example be placed in bank devices, access control units to premises or computers, control units of dangerous equipment, devices comprising security modules enabling keys or signatures to be generated by means of cryptographic calculation, television decoders, etc.

Figure 2:
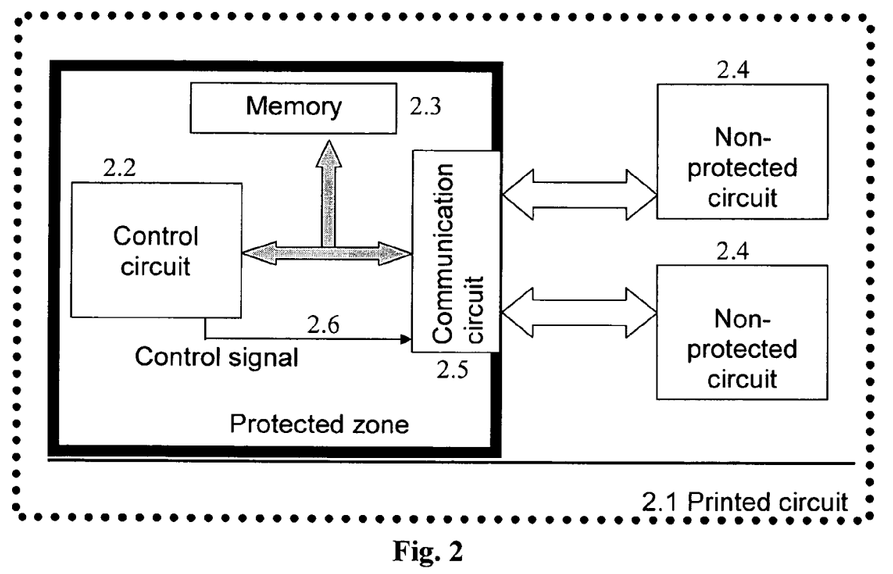
FIG. 2 shows a block diagram of an electronic card showing the protected zone according to an embodiment.

FIG. 2 shows a block diagram of the printed circuit 2.1 diagrammatically showing the circuits to protect and the circuits that do not need to be protected. The circuits to protect are grouped in one zone of the printed circuit, thus defining a protected zone. These circuits follow the rule of 3 millimeters, that is they are not distant from each other by more than 3 millimeters and nor do the tracks carrying the signals to protect between the circuits of the protected zone become greater than this distance. Among these circuits, it is typical to find a control unit 2.2 that in some cases can be the central processing unit 3 globally controlling the receiver 1 and a read-only memory 2.3 for the storage of the executable code and the secret data. The other circuits 2.4 do not need to be so close provided that they do not receive protected signals. To avoid receiving them, the protected zone is equipped with a "transmitter circuit for logical bus with isolated output" 2.5 or "buffer". The buffer 2.5 realises a portal function able to exchange signals between a protected zone of the card and the rest of the electrical circuits. In the embodiment, this door is a bidirectional amplifier (or "buffer"), for example a circuit referenced 74LVCR2245APW. This circuit has two control inputs: the DIR input (not shown) defines the direction of the data, it is connected to the control circuit 2.2 that at any time define transmission direction of the data of the bus. The OE (Output Enable) input enables or does not enable the output of the buffer 2.5, namely if this input is not enabled, the outputs are in three state logic and then it is not possible to read the data placed at the input. If the OE input is enabled, then the outputs exactly reproduce the signals placed on the different input lines of the buffer 2.5. The OE input is connected by a wire 2.6 to the control unit 2.2. It will be noted that all the circuits 2.2, 2.3 and 2.5 must obey the rule of 3 millimeters.

Protection is provided in the following manner. When the control circuit 2.2 executes an instruction for which the data must not be captured outside of the protected zone, it disables the buffer 2.5 by transmitting the command on the wire 2.6. The signals then remain localised in the protected zone. If the instruction executed by the control circuit 2.2 does not need to be protected, then the buffer 2.5 is disabled thus allowing the transfer in one direction or the other of the data to the circuits 2.4 outside of the protected zone. In a mode where the security is increased, all the signals exchanged between the protected zone and the other electronic circuits pass through the buffers 2.5. The reference 74LVCR2245APW relates to a circuit without pins accessible at a test point and allowing a transfer of data on eight lines. For a bus of 16 data bits, 24 address bits and 5 control lines, six buffers 2.5 are thus required. According to an improvement of the invention, some of the data signals exchanged pass through a buffer 2.5, with the most sensitive having priority. Experience shows that it is possible to reduce by 2 to 3 the number of lines passing through the buffer 2.5 without noticeably reducing the security. In this manner, the number of buffers to implement can be limited, this advantage is all the more important as the buffers 2.5 must be located in the protected zone and therefore follow the rule of 3 millimeters. In the prototype realised, the signals passing through the buffer 2.5 are the signals:

- 6 of the 16 lines of the data bus, the choice of the lines is made according to the typography facilities,
- 8 most significant wires of the address bus, these wires appear to be more sensitive as by analysing their changes, it is possible to detect operating code block changes,
- the OE (Output Enable) control signals enabling the inputs outputs and RD/WR enabling the direction of the inputs outputs.

Figure 3:
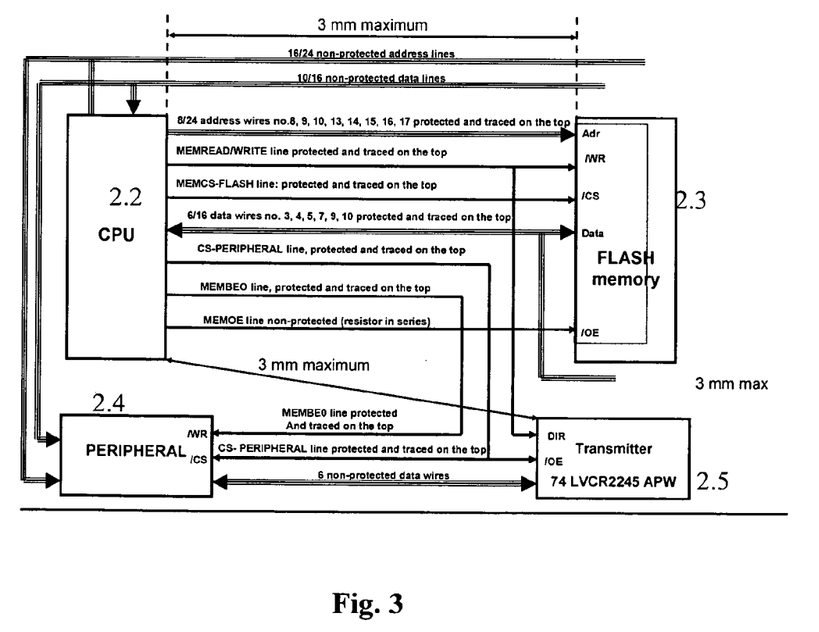
FIG. 3 shows a diagrammatic example of the main circuits of the protected zone according to an implementation example of the invention.

FIG. 3 is a diagram showing the main circuits of the protected zone with their main links. The interface circuit marked "PERIPHERAL TSOP" does not belong to the protected zone. It is seen that it is connected to the control circuit marked "BGA CPU" by lines passing the buffers 74LVCR2245APW and by direct lines, these direct lines not being protected.

Figure 4:
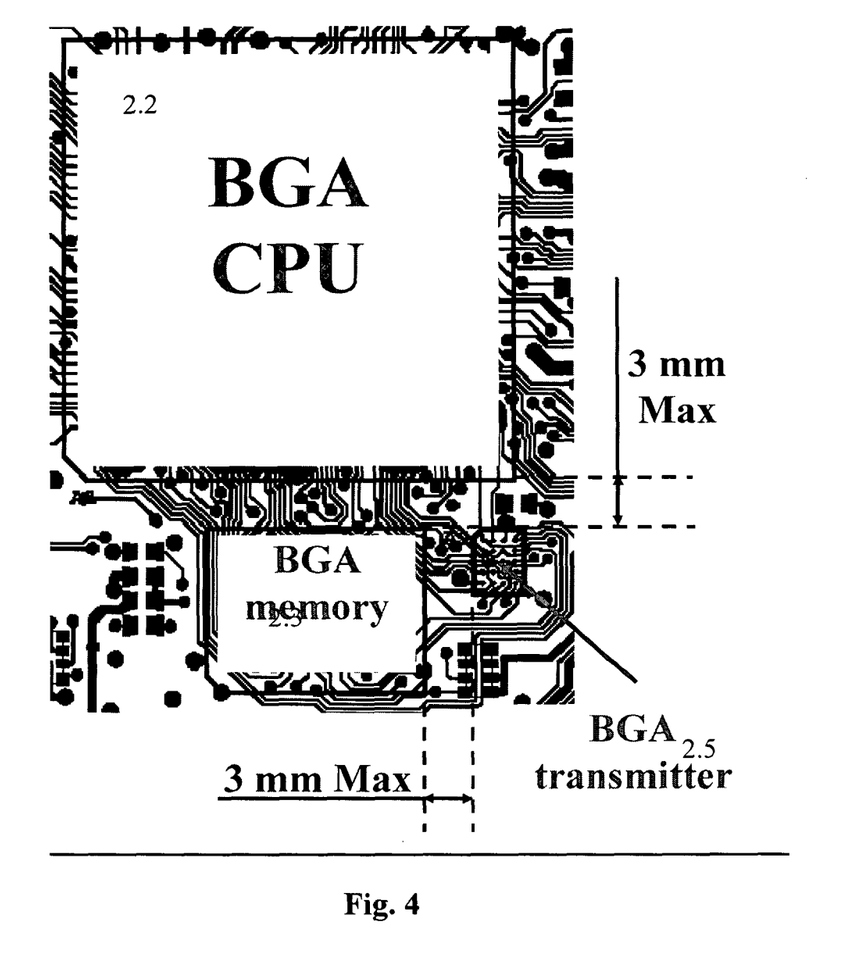
FIG. 4 shows an implementation drawing of the main circuits of the protected zone according to an implementation example.

FIG. 4 shows an implementation drawing of the main circuits of the protected zone according to the implementation example of the prototype realised. The application of the rule of 3 millimeters is notably seen.

According to a preferred embodiment, the logical status of the control wire 2.6 of the buffer 2.5 depends on the protected or non-protected character of the instruction currently executed by the control circuit 2.2. This circuit has two sets of instructions identified by operating codes, any instruction of the set of protection instructions triggers the enabling of the buffer 2.5 via the wire 2.6. The execution of an instruction of the non-protection set does not trigger the enabling of the buffer 2.5. A variant consists in that the control circuit 2.2 updates the logical status of the control wire 2.6 according to the memory address of the instruction to execute. A simple manner consists in sharing the bank programme memory and in assigning each bank an indicator specifying the protection character. When a bank is marked as "to protect", any instruction execution recording in this bank enables the control wire 2.6 to the buffer 2.5. Advantageously, the indicator is in an EEPROM memory integrated into the control circuit 2.2, its initialisation is carried out in customization mode of the component and after presentation of an access code. A third variant consists in that the control wire 2.6 of the buffer 2.5 must be connected to an output pin of an I/O port of the control circuit 2.2. Before executing an executable code routine, the control circuit 2.2 initialises, by an instruction, the value of the bit allowing the wire 2.6 to be enabled. At the end of the routine, by another instruction, the control circuit 2.2 disables the wire.

According to an improvement, the control circuit 2.2 has an input circuit allowing the electrical status of the wire 2.6 to be read. This improvement is particularly useful in the case where a malintentioned person succeeds in imposing an inactive status on this wire, which would leave the portal constituted by the buffer 2.5 open and would then allow the protected signals to be seen. The executable program can thus check whether the command of the logical status of the wire 2.6 indeed corresponds to its electrical level. If the program detects an electrical level corresponding to a disabling operation whereas its command enables it, it becomes blocked and forbids the execution of all protection functions. The blocking can consist in blowing a fuse within the control circuit. During subsequent powering up operations, the control unit 2.2 tests the status of the fuse and interrupts its operations if the fuse is blown. Another way consists in writing the information corresponding to the status of a fuse to an EEPROM cell in a memory internal or external to the control unit 2.2.

Figure 5:
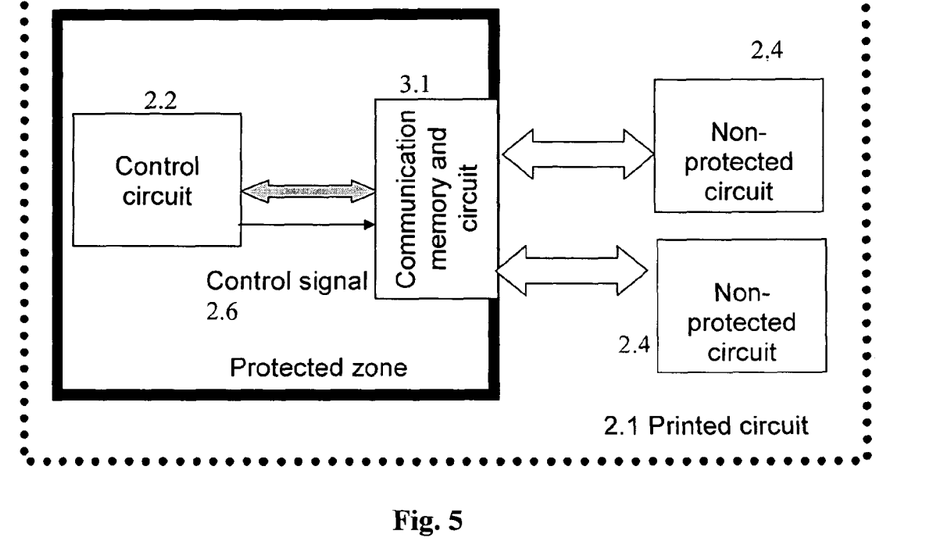
FIG. 5 shows a block diagram of an electronic card showing the protected zone according to an improvement.

According to another embodiment of the present invention, at least one part of the memory 2.3 is integrated into the buffer 2.5. FIG. 5 shows a block diagram of the printed circuit 2.1 diagrammatically showing the circuits to protect and the circuits that do not need to be protected. The memory 3.1 thus has a direct access port for the data bus, the address bus and the control signals, and a secondary port for the inputs and the outputs of signals to the non-protected part of the printed circuit. In this embodiment, the secondary port is seen by the control circuit 2.2 as a part of the memory, comprising a determined number of memory words, the memory word having a certain number of data bits. For example, the secondary port comprises 8 address lines, 8 data lines and control signals such as "R/W" and "VMA", signifying the direction of the data and the fact that the configuration of the address signals is valid on the secondary port. In this example, the secondary port is seen by the control circuit 2.2 as a memory of 256 bytes. The communication circuit (2.5) backs up the data and does not authorise the transmission of this data in the protected part when the electrical control signal (2.6) is enabled. In this manner, when the information is sensitive, it remains in the memory of the protected part and cannot be read by the electronic circuits of the non-protected part.

Figure 6:
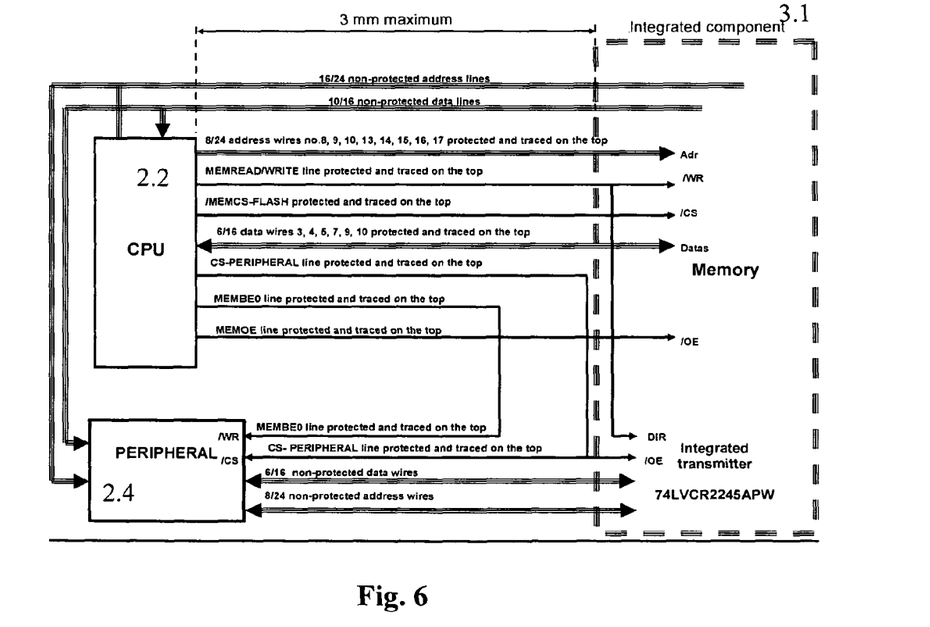
FIG. 6 shows a diagram of the main circuits of the protected zone according to the improvement illustrated by FIG. 5.

FIG. 6 is a diagram of the main circuits of the protected zone with their main links according to the other embodiment. The read-only memory comprises a memory of the "FLASH BGA" type and at least one buffer 74LVCR2245APW. It is seen in comparison with FIG. 3 that the number of links has reduced. Owing to the integration of the buffer and the memory into a single circuit, the size of the protected zone is reduced.

Figure 7:
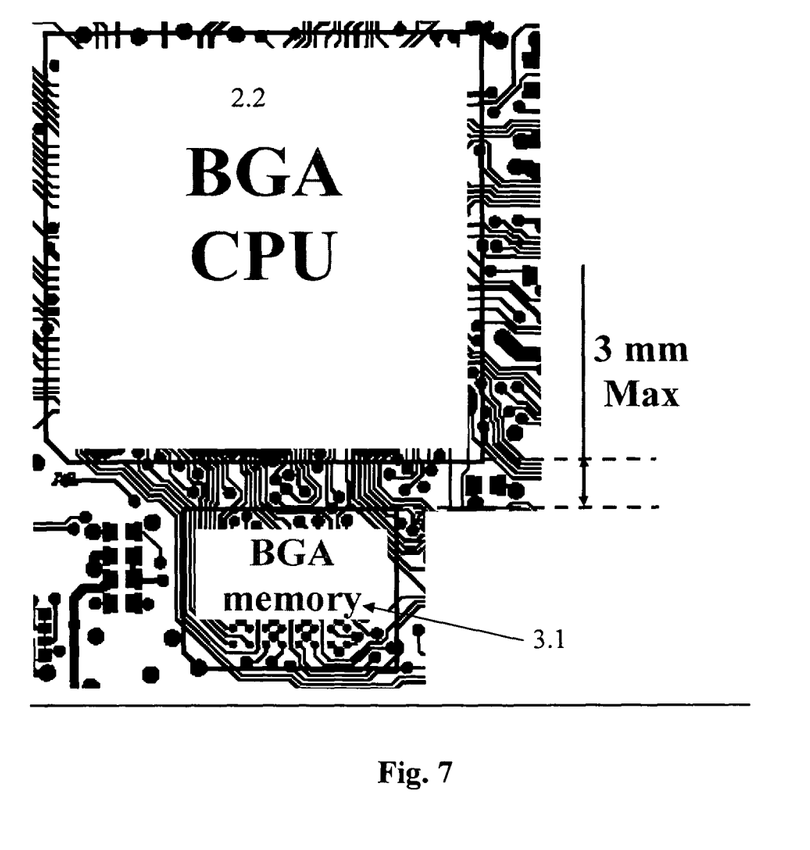
FIG. 7 shows an implementation drawing of the main circuits of the protected zone according to an implementation example.

La FIG. 7 shows an implementation drawing of the main circuits of the protected zone according to the other embodiment described by FIG. 4. In comparison with FIG. 4, the fact of going from three circuits to two circuits reduces the space occupied by the protected environment on the printed circuit.

The present embodiments must be considered to be illustrative in purpose but can be modified in the domain defined by the scope of the attached claims. In particular, the invention is not limited to the decoders described above but to any device equipped with circuits having security constraints.

The invention claimed is:

1. Electronic card comprising
a protected zone comprising
a plurality of first electronic circuits, including a control circuit, said first circuits being distant from each other by at most a determined distance,
the electrical links connected to the first circuits and transmitting the protected signals not becoming distant from said first circuits by more than said determined distance, and
a non-protected zone comprising second electronic circuits that are distant from the first circuits by more than the determined distance or whose electrical links transmitting the protected signals are distant by more than said determined distance,
wherein the protected zone comprises a communication circuit enabling a passage of signals between the first and second circuits, the passage of signals in the communication circuit being conditioned by an electrical control signal sent by the control circuit,
wherein the electrical control signal is connected to an input port of the control circuit in such a manner as to be able to read an electrical status of the electrical control signal, the control circuit becoming blocked if a status present on the port does not correspond to a logical status imposed by the control circuit.

2. Electronic card according to claim 1, wherein the electrical control signal conditioning the passage of signals in the communication circuit depends on an operating code of an instruction being executed in the control circuit.

3. Electronic card according to claim 1, wherein the electrical control signal conditioning the passage of signals in the communication circuit depends on an address of the operating code of an instruction being executed in the control circuit.

4. Electronic card according to claim 1, wherein the electrical control signal conditioning the passage of signals in the communication circuit is sent by an output port of the control circuit.

5. Electronic card according to claim 1, wherein the communication circuit contains a memory allowing the control circuit to back-up the data when the electrical control signal is enabled, blocking an output of the data to the non-protected zone.

6. Access control method to protect data within an electronic card comprising
- a protected zone comprising a plurality of first electronic circuits including a control circuit, said first circuits being distant from each other by at most a determined distance, electrical links connected to the first circuits and
- transmitting the protected signals not becoming distant from said first circuits by more than said determined distance, and
- a non-protected zone comprising second electronic circuits that are distant from the first circuits by more than the determined distance or whose electrical links transmitting protected signals are distant by more than said determined distance,
- wherein the protected zone comprises a communication circuit enabling a passage of signals between the first and second circuits, the passage of signals in the communication circuit being conditioned by an electrical control signal sent by the control circuit,
- the method comprising reading the electrical control signal by the control circuit, the electrical control signal being connected to an input port of the control circuit in such a manner as to be able to read an electrical status of the electrical control signal, and blocking said control circuit if a detected electrical status does not correspond to a status imposed by the control circuit.

7. Access control method to protect data according to claim 6, wherein the status of the electrical control signal depends on an operating code of an instruction being executed in the control circuit.

8. Access control method to protect data according to claim 6, wherein the status of the electrical control signal depends on an address of the operating code of an instruction being executed in the control circuit.

9. Access control method to data according to claim 6, further comprising memorizing the data in the communication circuit, when the electrical control signal is enabled, thus blocking an output of the data to the non-protected zone.

* * * * *